United States Patent Office 3,822,166
Patented July 2, 1974

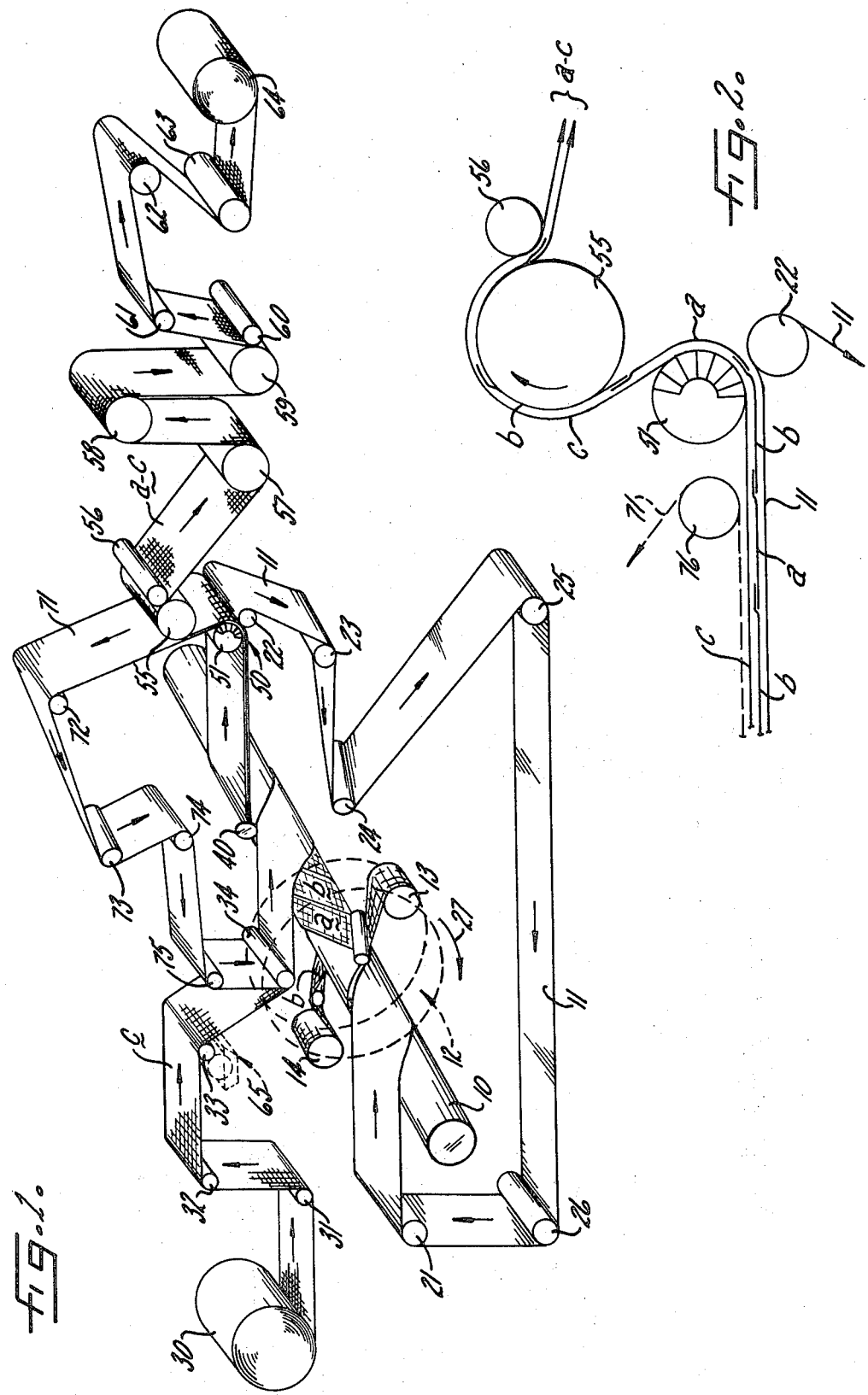

3,822,166
APPARATUS FOR CONTROLLING AND TRANSFERRING CROSS-LAID SHEETS
Dean K. Anderson, Neenah, Wis., assignor to Kimberly-Clark Corporation, Neenah, Wis.
Original application Feb. 28, 1969, Ser. No. 803,245, now Patent No. 3,616,007. Divided and this application July 29, 1971, Ser. No. 167,433
Int. Cl. B65h 81/00
U.S. Cl. 156—426    4 Claims

ABSTRACT OF THE DISCLOSURE

A method and apparatus for making multi-ply, cross-laid material is disclosed. The ply of material to be cross-laid is deposited by a rotatable carrier disposed about a mandrel on which a continuous carrier belt is helically wound. Another ply of material is helically wound on top of the cross-laid ply in advance of a slitter and, after slitting, the plies are separated from the carrier belt with the aid of a vacuum roll and directed into the nip of a pair of combining rolls. In its preferred embodiment, an upper hold down belt is also helically wound on the last turn of the mandrel.

---

This application is a division of application Ser. No. 803,245, filed Feb. 28, 1969, now U.S. Pat. No. 3,616,007.

BACKGROUND OF THE INVENTION

The present invention relates generally to cross-laying methods and apparatus and more particularly concerns apparatus for forming a two-ply web in which the long dimension of one web extends transversely across the other web.

It has previously been proposed, for example in Hirschy Pat. No. 2,841,202 and in an application of William H. Burger, Ser. No. 604,705, filed Dec. 27, 1966, now Pat. No. 3,492,185 to provide an apparatus of this general type in which a belt is spirally traveled around a mandrel, with a carrier for one or more satellite rolls of sheet material being disposed to rotate about the mandrel. The mandrel preferably is provided wiht openings through it, and air under pressure is supplied to the interior of the mandrel for floating the belt on the mandrel. A first web of sheet material travels longitudinally with the belt as the belt travels about the mandrel, and a second web of sheet material from a satellite roll is wound onto the first web carried by the belt as the carrier rotates about the mandrel so as to position the material of the second web transversely of the first web carried by the belt.

As further disclosed in the above-mentioned application, the carrier preferably carries a pair of satellite rolls of web material on opposite sides of the carrier axis for helically winding the web material from the satellite rolls onto the first web. A guide bar is provided for the web from each of the satellite rolls, and one of the guide bars is adjustable so that the positioning of one of the webs from one of the satellite rolls may be changed with respect to the other web from the other satellite roll to control the overlap of the web from the two satellite rolls. A cutter is disposed along the edge of the first web so as to sever the webs from the satellite rolls into segments of transversely extending web material lying on the outer surface of the first web supported by the belt. To prevent disturbance due to windage, a plurality of movable spaced belts have passes of them in substantial contact with the upper surface of the web material after it leaves the cutter for holding the segments of webs from the satellite rolls in place on the first web as it leaves the belt and is fed into the nip of a heated calender.

In such an apparatus, the overlapping of adjacent segments of the transversely extending web material places the leading edge of each segment over the trailing edge of the next preceding segment. In other words, the transverse segments are laid down, in a somewhat shingled fashion. As a result, there is a tendency of the leading edges of the transverse web segments to fold back as the composite web is fed into the nip of the calender rolls. This is undesirable since it results in irregular doubled over seams or laps in the finished product.

Accordingly, it is the primary aim of the present invention to provide an improved cross-laying method and apparatus which precludes the formation of folded back edges on the cross-laid sheets.

It is also an object to provide a cross-layer of the above type with an improved web control belt arrangement and with means for separating the composite web from both the carrier belt and the control belt.

It is a more specific object to provide such a cross-layer with an air permeable web control belt and to utilize a vacuum roll for assisting the separation of the composite web from the carrier and control belts.

SUMMARY OF THE INVENTION

According to the method and apparatus of the present invention a flexible endless belt is moved around a stationary mandrel through a plurality of helical turns. A carrier rotatable about the mandrel and journalling a pair of supply rolls of web material helically wraps the web material around the mandrel and onto the belt as the belt moves around one of the turns of the mandrel. This web material is applied to the belt at a substantial angle to the longitudinal dimension of the belt. A second web of material is introduced in registry with the belt as it moves around a subsequent helical turn on the mandrel to imprison the first web between the belt and the second web. A slitter disposed along the edge of the belt then cuts the imprisoned first web into transverse web segments and the composite web is carried off the mandrel by and separated from the belt with the aid of a vacuum roll. After separation from the belt the composite web is directed around a heated calender roll and into the nip formed by a cooperating pressure roll.

Due to the sequence in which the webs are helically wrapped on the mandrel the transversely extending web segments are arranged with their leading edges sandwiched between the trailing edge of the preceding web segment and the continuous upper web. This insures that the overlapping edges of the transverse web segments are not folded back causing doubled over laps as the composite web is fed around the calender roll and into the pressure nip.

The invention also contemplates the use of an upper holding belt introduced over and in registry with the second web to travel around the last helical turn on the mandrel. In the preferred embodiment the holding belt is air permeable and also passes around the vacuum roll which separates the composite web from both the main carrier belt and the holding belt.

BRIEF DESCRIPTION OF THE DRAWINGS

These and other objects and advantages of the invention will become more readily apparent upon reading the following detailed description and upon reference to the drawings, in which:

FIG. 1 is a schematic view of the cross-laying apparatus of the present invention with an alternate adhesive system indicated in phantom; and, FIG. 2 is an enlarged and somewhat exaggerated schematic view of the belt separating and web combining arrangement of the apparatus shown in FIG. 1, with an additional belt separating roll indicated in phantom.

While the invention will be described in connection with certain preferred embodiments and procedures, there is no intention to limit the invention to the specific embodiments and procedures described and illustrated. On the contrary, it is intended to cover all alternatives, modifications and equivalents as may be included within the spirit and scope of the invention.

DESCRIPTION OF THE PREFERRED EMBODIMENTS

Referring now to the drawings, the illustrated cross-laying apparatus includes a generally cylindrical mandrel 10 around which an endless belt 11 is helically wound through a plurality of turns. A spider or carrier 12 is rotatably disposed about the mandrel 10 and carries a pair of satellite rolls 13 and 14 of elongated web material. The mandrel 10 is preferably in the form of a hollow cylindrical shell having a plurality of air discharge openings therein and the interior of the mandrel is supplied with air under pressure in order to floatingly support the belt 11 on the surface of the mandrel. Further details of the mandrel 10 and the carrier 12 and its satellite rolls 13, 14 are disclosed in the above-mentioned Burger Pat. No. 3,492,185 to which reference may be made. However, in keeping with the present invention, the mandrel 10 is provided with an additional helical turn for the belt 11 and the web material from satellite rolls 13 and 14 is helically wound on the surface of the belt 11 rather than on a web of material traveling with the belt as disclosed in Pat. No. 3,492,185.

Pursuant to the present invention, and as shown schematically in FIG. 1, the belt 11 makes three turns or wraps of the mandrel 10. The belt 11 is also supported by a plurality of rolls and guide bars 21–26 mounted in a suitable frame (not shown). The location and disposition of the roller 21 relative to the mandrel 10 determines the approach angle of the belt 11 to the mandrel and thus the angle of the helical turns. Roller 22 supports the belt 11 as it is moved off the mandrel and may also be a drive roll. Rollers 23 and 26 and turning bars 24 and 25, which may be of the air floating type, define the return path of the belt 11.

The carrier 12 is rotated about the mandrel 10 in the direction of the arrow 27 and in timed relation to the helical movement of the belt 11 on the mandrel. As the carrier 12 rotates, webs $a$ and $b$ of the elongated web material from supply rolls 13 and 14, respectively, are helically wound about the mandrel 10 and onto the surface of the belt 11. The width of the satellite rolls 13 and 14 and of the webs $a$ and $b$ and the other parameters of the system are such that the complete outer surface of the belt 11 is covered by the webs $a$ and $b$; and the webs $a$ and $b$ overlap slightly (see FIG. 2) and have their longitudinal dimensions extending at an angle, such as 90°, with respect to the longitudinal dimension of the belt 11. In other words the webs $a$ and $b$ are helically wound, in a generally shingled fashion, substantially transverse to the belt 11.

Following the helical wrapping of webs $a$ and $b$ on the belt, and in further keeping with the present invention, another web $c$ is introduced in registry with the belt 11 and wound about the mandrel in a subsequent helical turn. The web $c$ is drawn from a supply roll 30 and is trained over rolls 31–34 which guide the web to the mandrel in registry with the belt 11 as it travels about the mandrel 10. The web $c$ thus overlies the surface of webs $a$ and $b$ and imprisons webs $a$ and $b$ between web $c$ and the belt 11.

The web $c$ preferably makes at least one complete helical turn on the mandrel and a slitter 40 is disposed to cut the webs $b$ and $c$ into transverse segments along the edges of the web $c$ and belt 11. Following the slitting operation, the belt 11 and composite web $a$–$c$ move off the mandrel 10 in the direction of support roller 22.

In keeping with another aspect of the invention, vacuum means 50 are provided for separating the composite web $a$–$c$ from the belt 11. The vacuum means includes a vacuum roll 51 having an outer rotatable shell in which a plurality of circumferentially spaced apertures are located and a stationary inner vane structure which limits the effective area through which the vacuum is drawn to only a portion of the circle through which the shell rotates. As the composite web travels around the vacuum roll 51, the vacuum draws the composite web $a$–$c$ toward the surface of the vacuum roll and away from the belt 11.

After separation of the composite web $a$–$c$ from the belt 11, the web $a$–$c$ is directed around a heated calender roll 55 and into a nip formed between the heated calender roll 55 and a pressure roll 56. The web $a$–$c$ desirably then is directed over a series of steam drums or the like 57–59 and into the nip of a finishing calender formed by drum 59 and a pressure roll 60. Thereafter, the web $a$–$c$ passes over a guide roll 61 and a series of cooling drums 62 and 63 before being wound on a take-up roll 64.

It is an important aspect of the invention that the web $c$ overlies the transverse segments of webs $a$ and $b$ as the composite web $a$–$c$ leaves the mandrel 10. Then as the composite web $a$–$c$ is separated from the carrier belt 11 by the vacuum roll 51 and directed around the heated calender roll 55 this places the segments $a$ and $b$ against the surface of the heated roll and imprisoned under web $c$. More importantly, and as shown in somewhat exaggerated fashion in FIG. 2, this arrangement places the leading edge of each transverse segment $a$ and $b$ between the trailing edge of the next preceding segment $a$ or $b$ and the web $c$. In other words, since only the trailing edges of the web segments $a$ and $b$ are exposed, there is no danger of the leading edges of the web segments $a$ and $b$ being folded back as they travel around heated calender roll 55 and into the nip formed with pressure roll 56.

The webs $a$, $b$ and $c$ may be formed of a variety of materials such as cellulosic tissue, self-sustaining webs of drafted fibers, thread reinforced films or some combination of these, for example. One particularly advantageous web material is a tissue fiber laminate such as disclosed in Sokolowski Pat. No. 3,327,708 wherein a layer of highly-drafted, staple length fibers extended to substantially their full length and disposed in parallel condition are bonded by a spaced pattern of flexible adhesive to at least one layer of light-weight cellulosic tissue.

It has further been found, for example as disclosed in copending Sokolowski et al. application Ser. No. 546,067, filed Apr. 28, 1968, now Pat. No. 3,484,330 that two webs of material of the type described and claimed in the above-mentioned Sokolowski patent can be cross-laid and bonded together without the use of additional adhesive to produce a composite material having greatly improved longitudinal and cross direction tensile strengths than would be expected by simply combining the two base webs. In producing such a material on the cross-laying apparatus of the present invention, the adhesive in each web of material is softened and reactivated by the application of heat and the fibers in the two adjacent fiber layers are partially embedded and held by the adhesive of each patterned layer of adhesive.

In the present instance the initial calender roll 55 heats and softens the adhesive in the webs $a$, $b$ and $c$ at least enough so that, with the pressure applied by roll 56 the composite web $a$–$c$ is self-sustaining as it leaves the nip of rolls 55 and 56. Additional heat may then be supplied, as in the illustrated apparatus, by passing the composite web $a$–$c$ around steam drums 57–59 before directing it into the nip of the finishing calender formed by rolls 59 and 60. Preferably, such material is then cooled by passing it over cooling drums 62 and 63 or the like before it is wound on the take-up roll 64 for storage.

It should be appreciated, of course, that the present invention is not limited to cross-laying material of the type just described or the particular sequence or arrangement of the heating, calendering and cooling means illustrated in the drawings. Thus, the webs a, b and c or some of them can include thermoplastic fibers, or films which when heated, form the bonding agent in the composite web a–c. Also, fresh adhesive can be applied to one or more of the webs, such as web c for example, by an adhesive printer or the like as is indicated generally and in phantom at 65 in FIG. 1. Moreover, the mandrel may be heated, if desired, or the composite web may pass through a heating tunnel or the like (not shown) to heat and soften the thermoplastic adhesive somewhat even before directing the web around the heated calender roll 55.

The material of the web c, at least, should be air permeable in view of the fact that the composite web a–c is separated from the belt 11 with aid of the suction means 50 in the preferred apparatus. However, it will also be appreciated that due to the manner in which the leading edge of each transverse web segment a and b is sandwiched between the trailing edge of the preceding segment and the top web c, these transverse segments a and b tend to automatically follow around the calender roll 55; provided, of course, that the tangent distance between rolls 51 and 55 does not exceed the distance between the leading and trailing edges of the transverse web segments a and b.

The method and apparatus of the present invention also contemplates cross-laying webs which have very low inherent strength characteristics. Thus, the webs a, b and c may be of the type disclosed in copending Saunders et al. application Ser. No. 79,287, filed Oct. 8, 1970, wherein an extremely light-weight web of highly-drafted and aligned fibers in substantially fully extended and aligned configuration is bonded and sustained by an open pattern of flexible adhesive. To handle webs of this type, the cross-laying apparatus of the present invention is provided with an upper web holding and control belt 71 which is disposed to travel around the mandrel 10 in registry with the web c and with the belt 11 as it makes its third helical turn on the mandrel.

As shown in FIG. 1, the belt 71 is guided onto the mandrel 10 by roller 34 which also guides the web c. In the preferred embodiment, the belt 71 is made of an air permeable material such as heavy cloth, canvas or the like and is trained about the vacuum roll 51 on the exit side of the mandrel 10. The belt then passes between the vacuum roll 51 and the heated calender roll 55 and over guide elements 72–75 of which 73 and 74 are preferably turning bars of the air float type and 72 and 75 are guide rolls. Alternatively, and as shown in phantom in FIG. 2, if the belt 71 is made of a non-permeable material it is directed over a return roll 76 in advance of the vacuum separating roll 55. In either case the belt is driven by suitable means (not shown) in timed relation with the belt 11 so that the tension otherwise necessary on web c to carry it helically around the mandrel is substantially reduced.

From the foregoing description the method of operation of the cross-laying apparatus of the present invention should be clear to one skilled in the art. Nevertheless, the following resume may be helpful.

As the belt 11 is helically moved around the mandrel 10, the carrier 12 helically wraps webs a and b from supply rolls 13 and 14 on the surface of the belt and at a substantial angle, such as 90° to the longitudinal dimension of the belt. Web c is then introduced in registry with the belt 11 as it makes another helical turn on the mandrel 10 and imprisons the webs a and b between web c and the belt. If web c is made of material having very low inherent strength an upper holding belt 71 is also introduced to the mandrel 10 in registry with the belt 11 as it makes the last helical turn on the mandrel. A slitter disposed along the edges of belts 11 and 71 and web c cuts webs a and b into transverse web segments held between the web c and the belts.

From the mandrel the composite web a–c passes over a vacuum roll 51 which separates the web from the belt 11, and also from belt 71 in the preferred embodiment. Alternatively, if a non-permeable hold down belt is used it is separated from the composite web a–c by a separating roll 76 in advance of the vacuum roll 51. After separation from the belt 11, the composite web is directed around a heated calender roll 55 and into the nip formed with a cooperating pressure roll 56. As previously explained, the shingled relation of the overlapping edges of the transverse web segments essentially precludes doubling back of the edges as they pass around the calender roll 55 and into the nip it forms with the pressure roll 56.

I claim as my invention:

1. An apparatus for forming a composite multi-ply web product comprising, in combination, a mandrel, a flexible endless belt disposed about said mandrel in a plurality of helical turns, a rotatable carrier disposed about said mandrel and journalling a first supply roll of elongated web material, driving means for moving the belt helically around the mandrel and for rotating the carrier about the mandrel so that the web material is applied in the form of a helix on the surface of and at a substantial angle to the longitudinal dimension of the belt as the belt moves around one of said helical turns, means for introducing a second elongated web of material downstream of said one helical turn and in registry with said belt as it moves around a subsequent one of said helical turns, slitting means disposed along the edge of said belt for cutting the first web into transverse web segments imprisoned between the belt and the second web of material, means including a vacuum roll around which the second web is partially wound for separating the composite web formed of the first and second webs from the belt after slitting the first web, and means for bonding the composite web together to form a self-sustaining web, said bonding means including a heated calender roll disposed to receive the composite web material from said vacuum roll with the second web material holding the transversely extending web segments against the surface of the calender roll so that the leading edge of each of the transverse cut web segments is imprisoned between the second web material and the trailing edge of the preceding transverse cut web segment.

2. An apparatus as defined in claim 1 including an endless holding belt and means for introducing said holding belt on top of said second web as it moves around said subsequent helical turn.

3. An apparatus as defined in claim 2 wherein said holding belt is air permeable and passes partially around said vacuum roll.

4. An apparatus as defined in claim 3 wherein the holding belt follows an egress path from said vacuum roll passing between said vacuum roll and said calender roll and said vacuum roll includes means for terminating the vacuum along an axially extending peripheral line substantially tangent with the egress path of the holding belt.

References Cited

UNITED STATES PATENTS

| | | | |
|---|---|---|---|
| 1,332,534 | 3/1920 | Angier | 156—430 X |
| 2,841,202 | 7/1958 | Hirschy | 156—426 |
| 3,492,185 | 1/1970 | Burger | 156—425 |
| 3,489,635 | 1/1970 | Taylor | 156—426 |
| 3,533,883 | 10/1970 | Gartaganis et al. | 156—195 X |
| 3,514,354 | 5/1970 | Andersson | 156—157 |

CHARLES E. VAN HORN, Primary Examiner

D. H. SIMMONS, Assistant Examiner

U.S. Cl. X.R.

156—285, 193, 543, 195; 226—95